US012599919B2

(12) United States Patent
Sasaki et al.

(10) Patent No.: US 12,599,919 B2
(45) Date of Patent: Apr. 14, 2026

(54) SLOT-TYPE SPRAY NOZZLE, COATING DEVICE, AND MANUFACTURING METHOD OF FILM-COATED MEMBER

(71) Applicant: Toray Industries, Inc., Tokyo (JP)

(72) Inventors: Kota Sasaki, Otsu (JP); Ryuta Sakashita, Otsu (JP); Kohei Ueda, Otsu (JP); Kiyoshi Minoura, Otsu (JP)

(73) Assignee: Toray Industries, Inc., Tokyo (JP)

( * ) Notice: Subject to any disclaimer, the term of this patent is extended or adjusted under 35 U.S.C. 154(b) by 77 days.

(21) Appl. No.: 18/718,558

(22) PCT Filed: Nov. 4, 2022

(86) PCT No.: PCT/JP2022/041239

§ 371 (c)(1),
(2) Date: Jun. 11, 2024

(87) PCT Pub. No.: WO2023/112542

PCT Pub. Date: Jun. 22, 2023

(65) Prior Publication Data

US 2025/0041885 A1 Feb. 6, 2025

(30) Foreign Application Priority Data

Dec. 16, 2021 (JP) ................................ 2021-204235

(51) Int. Cl.
*B05B 7/08* (2006.01)
*B05B 13/02* (2006.01)
*B05D 1/02* (2006.01)

(52) U.S. Cl.
CPC ........ *B05B 7/0815* (2013.01); *B05B 13/0278* (2013.01); *B05D 1/02* (2013.01)

(58) Field of Classification Search
None
See application file for complete search history.

(56) References Cited

U.S. PATENT DOCUMENTS 5,421,921 A 6/1995 Gill et al.
2005/0120947 A1* 6/2005 Sone .................... B05B 7/0884 118/325

(Continued)

FOREIGN PATENT DOCUMENTS

JP H06254446 A 9/1994
JP 2002102765 A 4/2002

(Continued)

OTHER PUBLICATIONS

Int'l Search Report (PCT/ISA/210) w/ translation & Written Opinion (PCT/ISA/237) mailed on Jan. 17, 2023, by the Japanese Patent Office in Int'l App. No. PCT/JP2022/041239. (8 pages).

(Continued)

*Primary Examiner* — Michael P. Rodriguez
(74) *Attorney, Agent, or Firm* — Buchanan Ingersoll & Rooney PC

(57) ABSTRACT

A slot-type spray nozzle includes: a plurality of coating fluid discharge ports arranged in one direction; and a pair of air discharge ports continuously or intermittently opened in a vicinity of the coating fluid discharge ports in a width direction, the width direction being the one direction, the air discharge ports being arranged to sandwich the coating fluid discharge ports, the air discharge ports being formed such that air discharged from the air discharge ports obliquely intersects with a discharge direction of coating fluid.

9 Claims, 8 Drawing Sheets

(56) References Cited

U.S. PATENT DOCUMENTS

| | | | |
|---|---|---|---|
| 2007/0125877 | A1 | 6/2007 | Zillig et al. |
| 2007/0125888 | A1 | 6/2007 | Zillig et al. |
| 2015/0048175 | A1 | 2/2015 | Shimada et al. |

FOREIGN PATENT DOCUMENTS

| | | | |
|---|---|---|---|
| JP | 2006026576 | A | 2/2006 |
| JP | 2009517213 | A | 4/2009 |
| JP | 2013111512 | A | 6/2013 |
| JP | 2015047574 | A | 3/2015 |
| JP | 2021-139066 | A | 9/2021 |
| WO | 2013146624 | A1 | 10/2013 |

OTHER PUBLICATIONS

Extended European Search Report issued Nov. 10, 2025, by the European Patent Office in corresponding European Patent Application No. 22907075.0-1055. (6 pages).

* cited by examiner

SLOT-TYPE SPRAY NOZZLE, COATING DEVICE, AND MANUFACTURING METHOD OF FILM-COATED MEMBER

CROSS REFERENCE TO RELATED APPLICATIONS

This application is the U.S. National Phase of PCT/JP2022/041239, filed Nov. 4, 2022, which claims priority to Japanese Patent Application No. 2021-204235, filed Dec. 16, 2021, the disclosures of these applications being incorporated herein by reference in their entireties for all purposes.

FIELD OF THE INVENTION

The present invention relates to a slot-type spray nozzle, a coating device using the slot-type spray nozzle, and a manufacturing method of a film-coated member using the coating device.

BACKGROUND OF THE INVENTION

Conventionally, as devices for applying coating fluid to a substrate to be coated (hereinafter, also simply referred to as a “substrate”), spray coating devices are known which spray coating fluid after forming droplets of the coating fluid by a spray nozzle (hereinafter, also simply referred to as a “nozzle”).

In these spray coating devices, from the viewpoint of productivity and functionality of the substrate, it is often desired to form a thin coating film having a uniform thickness on substantially the entire surface of a wide substrate.

As a coating unit in such a case, for example, Patent Literature 1 discloses a spray coating device that forms a thin coating film on a wide substrate, the spray coating device in which a plurality of two-fluid single-hole type spray nozzles, capable of forming a thin film by discharging compressed air simultaneously with coating fluid, micronizing the coating fluid by a strong striking force (collision force with the coating fluid) of the discharged air, and spraying the coating fluid, is arrayed at equal intervals in a width direction of a substrate, by conveying the substrate while spraying the coating fluid simultaneously such that the coating fluid sprayed from the nozzles overlaps. However, in this spray coating device, since each nozzle is an independent component, variations in spray state are likely to occur due to individual differences of the nozzles, namely, the variation in shape among the nozzles. In addition, since the discharged air and the coating fluid droplets sprayed from each nozzle fly while expanding in the width direction in the form of a fan shape, a cone shape, or the like, application stripes are likely to occur due to interference at portions where the application overlaps between the nozzles, and it is difficult to form a uniform coating film.

To address the disadvantage of such a single-hole type nozzle, as a two-fluid type spray nozzle capable of widely, thinly, and uniformly applying a coating film, Patent Literature 2 discloses a slot-type spray nozzle having a plurality of coating fluid discharge ports in an application width direction of a substrate and a pair of air discharge ports arranged in such a manner as to sandwich the coating fluid discharge ports that are continuously or intermittently opened over the width direction in the vicinity of the coating fluid discharge ports. The spray nozzle discharges the coating fluid to generate a coating fluid pool exposed at the distal end of the coating fluid discharge port and instantaneously repeats an operation of applying a striking force of discharged air to the coating fluid pool to separate the coating fluid pool from the spray nozzle, thereby enabling generation of fine coating fluid droplets. In addition, since the spray nozzle has a single nozzle over the application width, the variation in the shape at each coating fluid discharge port can be suppressed as compared with those in a single-hole type nozzle, and the coating fluid can be sprayed with high uniformity in the application width direction. Furthermore, since air having a single band shape substantially continuous over the width direction of a substrate is discharged, the discharged air and the coating fluid droplets are sprayed in a direction substantially perpendicular to the width direction, the interference between the coating fluid discharge ports is reduced, and an extremely uniform thin coating film can be formed on the substrate.

PATENT LITERATURE

Patent Literature 1: JP 2013-111512 A
Patent Literature 2: JP 2006-026576 A

SUMMARY OF THE INVENTION

However, even in the case of the slot-type spray nozzle disclosed in Patent Literature 2, straightness of the coating fluid droplets may be altered after being sprayed, thereby resulting in coating film unevenness. This is mainly because the flow of air present around the spray nozzle is excited by the drawing effect of a jet which is a viscous fluid, and the flight of the coating fluid droplets are affected by the interference by the drawn ambient air. In particular, a slot-type spray nozzle that discharges substantially continuous band-shaped air tends to have a larger discharged air flow rate than a structure in which a plurality of two-fluid single-hole type nozzles is arranged, and as the discharged air flow rate is larger, the ambient air outside the nozzle is drawn, and thus the flow of the discharged air is likely to be disturbed.

Meanwhile, to reduce the influence of the ambient air, it is only required to reduce the discharged air flow rate. However, in a case where the discharged air flow rate is reduced, there is a disadvantage that fine coating fluid droplets are not formed and that a thin coating film cannot be formed since a sufficient striking force cannot be applied to the coating fluid pool generated at the distal end of the coating fluid discharge port and the coating fluid pool cannot be separated from the nozzle unless the coating fluid pool grows to a certain extent.

The present invention has been made in view of the above disadvantage and provides a spray nozzle capable of forming fine coating fluid droplets even in a case where a discharged air flow rate is reduced and uniformly forming a thin coating film on a wide substrate. Furthermore, a spray coating device using the spray nozzle and a manufacturing method of a film-coated member using the spray coating device are provided.

In order to solve the above-described problem, a slot-type spray nozzle according to the present invention includes: a plurality of coating fluid discharge ports arranged in one direction; and a pair of air discharge ports continuously or intermittently opened in a vicinity of the coating fluid discharge ports in a width direction, the width direction being the one direction, the air discharge ports being arranged to sandwich the coating fluid discharge ports, the air discharge ports being formed in such a manner that air discharged from the air discharge ports obliquely intersects with a discharge direction of coating fluid, in which the slot-type spray nozzle further includes a pair of fluid holding surfaces extending in the discharging direction of the coating fluid from sides forming both ends in the width direction of the coating fluid discharge ports, the fluid holding surfaces facing each other across the coating fluid discharge ports, and with a length of the fluid holding surfaces in the discharge direction of the coating fluid denoted by H1 (μm), an angle (acute angle) formed by a discharge direction of the air discharged from an air discharge port and the discharge direction of the coating fluid denoted by θ (degrees), and an interval between the coating fluid discharge ports and the air discharge port denoted by L2 (μm), H1≥30 μm and following Inequation (1) are satisfied:

$$(L2/\tan\theta)-100 \le H1 \le L2/\tan\theta \quad (1).$$

The slot-type spray nozzle according to the present invention preferably has the following embodiments.

(1) The coating fluid discharge ports are formed of a comb-shaped shim and a pair of nozzle blocks clamping the comb-shaped shim, the comb-shaped shim protrudes from distal ends of the nozzle blocks in the discharging direction of the coating fluid, and the fluid holding surfaces are a part of a portion of the comb-shaped shim, the portion protruding from the nozzle blocks.

(2) A surface of the portion of the comb-shaped shim protruding from the nozzle blocks has fluid repellency against water, the surface observable from a thickness direction of the comb-shaped shim.

(3) The fluid holding surfaces are substantially orthogonal to the width direction.

(4) A radius of curvature of a ridge line of a distal end of each of the fluid holding surfaces is less than or equal to 30 μm.

(5) The L2 is less than or equal to 100 μm.

A coating device according to the present invention includes: the slot-type spray nozzle according to the present invention; a supply unit configured to supply the coating fluid and the air to the slot-type spray nozzle; a support unit configured to support a to-be-coated member; and a moving unit configured to relatively move the to-be-coated member supported by the support unit with respect to the slot-type spray nozzle.

A manufacturing method of a film-coated member according to the present invention includes: using the coating device according to the present invention; discharging the coating fluid from the coating fluid discharge ports while discharging the air from the air discharge ports; and spraying the coating fluid onto the to-be-coated member supported by the support unit to manufacture a member on which a coating film is formed.

It is preferable that the manufacturing method of a film-coated member according to the present invention in which an air flow rate discharged from the air discharge ports is within a range of 900 NL/min to 1500 NL/min per width of 1 m.

In this patent application, the "width direction" means a direction in which a plurality of coating fluid discharge ports are arranged.

ADVANTAGEOUS EFFECTS OF INVENTION

By using a slot-type spray nozzle of the present invention, a coating film can be formed thinly, widely, and uniformly on a substrate.

DETAILED DESCRIPTION OF EMBODIMENTS OF THE INVENTION

As a result of intensive studies on the above disadvantages, the present inventors have found that coating fluid droplets are micronized by being separated from a spray nozzle in a state where a coating fluid pool generated at the distal end of the nozzle is small. More specifically, the present invention has been devised since it has been found that the uniformity of the coating film is improved by reducing the discharged air flow rate to mitigate deterioration of the straightness at the time when the coating fluid droplets fly while the state in which a thin film can be formed is maintained due to a fact that the coating fluid droplets are micronized by matching the position at which a coating fluid pool is separated with the position at which the striking force of the discharged air is obtained and reducing a contact area between the coating fluid pool and a nozzle surface.

Note that the gas component of air or the outside air used in the present invention is not particularly limited as long as it is a gas suitable for coating, and air, nitrogen gas, or the like can be used. The ambient pressure of the outside air is not particularly limited and can be subjected to an atmospheric pressure environment, a reduced pressure environment, or the like.

The coating fluid used for spray coating is not particularly limited, and examples thereof include solutions of inorganic substances or organic substances, slurries in which inorganic substances or organic substances are dispersed in a binder and a solvent, or the like. The viscosity of the coating fluid is required to be low enough to micronize the coating fluid by the striking force of the discharged air and is generally preferably less than or equal to 500 mPa·s.

Hereinafter, embodiments of the present invention will be described in detail with reference to the drawings. Note that the following description is given to facilitate understanding of the present invention and does not limit the present invention in any way. The scope of rights of the present invention is not limited to the following embodiments but includes all modifications within the scope equivalent to the structures described in the claims.

Figure 1:
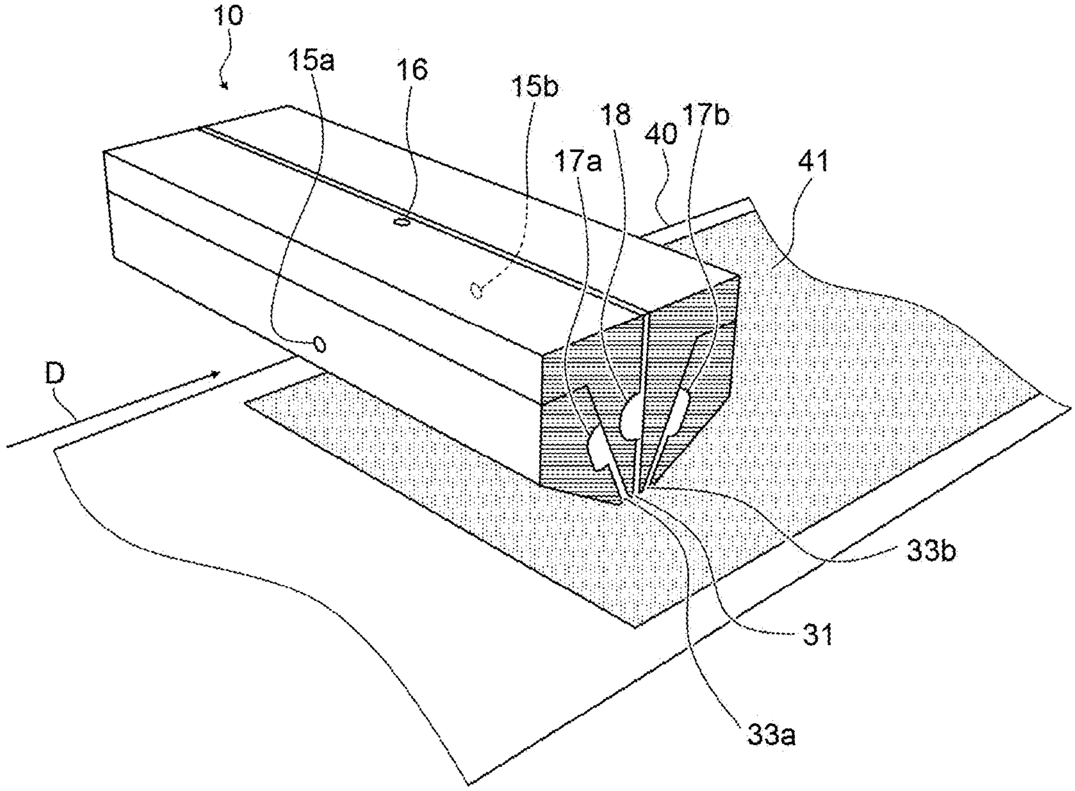
FIG. 1 is a perspective view illustrating a schematic structure of a spray nozzle of the present invention.

FIG. 1 is a perspective view illustrating a schematic structure of a spray nozzle of the present invention. Illustrated in FIG. 1 is a part of a spray nozzle 10, and hatching in the drawing indicates a cross section of the spray nozzle 10. The spray nozzle 10 has a longitudinal direction in a direction orthogonal to a conveyance direction D of a long substrate 40, namely, in the width direction of the substrate 40 and is disposed in such a manner as to face an application surface of the substrate 40 with a certain distance from the substrate 40. The coating fluid is supplied from a coating fluid supply port 16 included at the center of the spray nozzle 10 in the width direction, spread in the width direction by a coating fluid manifold 18, and discharged from coating fluid discharge ports 31. Meanwhile, discharged air is supplied from air supply ports 15*a* and 15*b* included at the centers in the width direction of the front face and the back face of the spray nozzle 10, respectively, spread in the width direction by air manifolds 17*a* and 17*b*, discharged from air discharge ports 33*a* and 33*b*, and converts the coating fluid discharged from the coating fluid discharge ports 31 into droplets by the striking force of the air. The coating fluid formed into droplets adheres onto the substrate 40 being conveyed along the flow of the discharged air, thereby forming a coating film 41. The material of members constituting the spray nozzle 10 is not particularly limited; however, it is preferable that all the members are made of a metal material, particularly stainless steel, from the viewpoint of working accuracy, durability, corrosion resistance, and the like.

Figure 2:
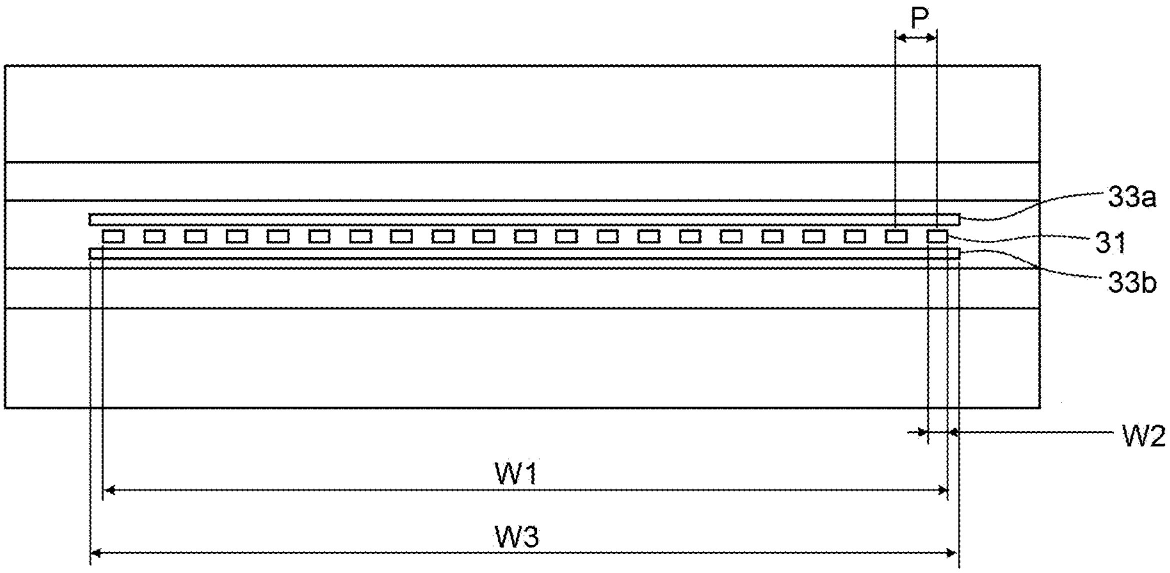
FIG. 2 is a bottom view of the spray nozzle of the present invention as viewed from a coating fluid discharge port side.

FIG. 2 is a bottom view of the spray nozzle of the present invention as viewed from the coating fluid discharge port side. On the bottom surface of the spray nozzle 10 illustrated in FIG. 2, the coating fluid discharge ports 31 has a rectangular opening end, and a plurality of coating fluid discharge ports 31 is arranged at equal intervals in the width direction (left and right direction in FIG. 2), whereby a coating fluid discharge width W1 is obtained as a whole. An optimum value of a width W2 of each of the coating fluid discharge ports 31 varies depending on the viscosity of the coating fluid in use and the flow rate of the coating fluid to be discharged; however, the width W2 is preferably more than or equal to 100 μm from the viewpoint of reducing the variation in the shape of the discharge ports and is preferably less than or equal to 400 μm in order to make the coating fluid to be distributed from the coating fluid manifold 18 to each of the coating fluid discharge ports 31 uniform in the amount. Furthermore, an arrangement pitch P of the coating fluid discharge ports 31 is preferably less than or equal to 10 mm from the viewpoint of uniformity in the width direction of a coating film.

Next, in the vicinity of the coating fluid discharge ports 31, a pair of air discharge ports 33*a* and 33*b* each having a slit shape and an air discharge width W3 is arranged in such a manner as to sandwich the coating fluid discharge ports 31. Incidentally, the air discharge width W3 is longer than the coating fluid discharge width W1 in order to uniformly micronize the whole coating fluid discharged from the coating fluid discharge ports 31 by the striking force of the air. Note that the air discharge ports 33*a* and 33*b* may be each opened in one slit continuous in the width direction as illustrated in FIG. 2 or may be opened intermittently corresponding to the coating fluid discharge ports 31 on a one-to-one basis. In the case of being opened intermittently, it may be circular, elliptical, or the like. In the case of being opened intermittently, an opening length in the width direction is preferably larger than W2.

Figure 3A:
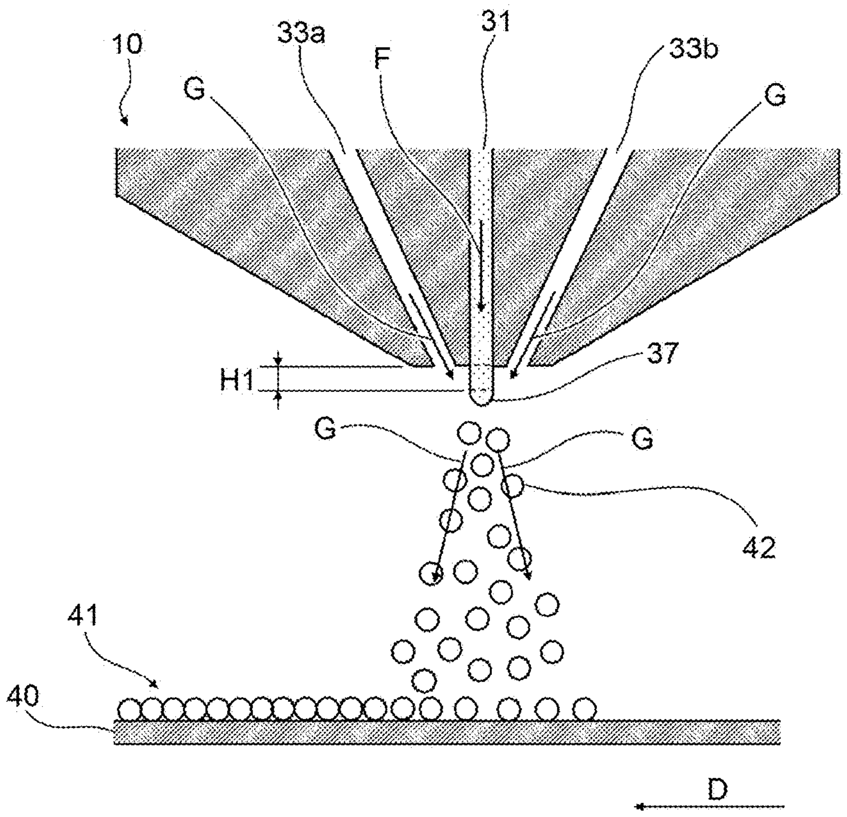
FIG. 3A is a diagram for explaining a flying state of coating fluid droplets at the time of spray nozzle application of the present invention and is a cross-sectional view as viewed from the width direction.
Figure 3B:
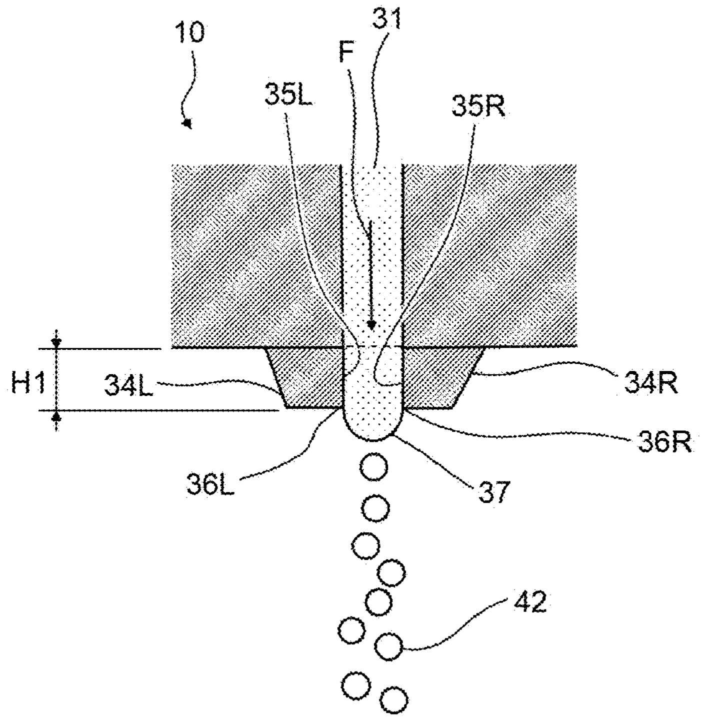
FIG. 3B is a diagram for explaining a flying state of the coating fluid droplets at the time of spray nozzle application of the present invention and is a cross-sectional view of a distal end of one coating fluid discharge port as viewed from a conveyance direction of the substrate.

FIG. 3A and FIG. 3B are diagrams for explaining a flying state of coating fluid droplets at the time of spray nozzle application of the present invention. FIG. 3A is a cross-sectional view (hereinafter, a width-direction cross-sectional view) as viewed from the width direction. FIG. 3B is a cross-sectional view of a distal end of one coating fluid discharge port as viewed from the conveyance direction of the substrate.

In this spray nozzle 10, coating fluid F is discharged from a coating fluid discharge port 31 illustrated in FIG. 3A, and furthermore, air G is discharged from the pair of air discharge ports 33*a* and 33*b* arranged in such a manner as to sandwich the coating fluid discharge port 31. As illustrated in FIG. 3B, in the vicinity of the distal end of the coating fluid discharge ports 31, fluid holding surface forming members 34L and 34R are provided which have fluid holding surfaces 35L and 35R, respectively, extending in the discharge direction of the coating fluid from substantially the entire lengths of the sides forming both ends in the width direction of the coating fluid discharge ports 31. The discharged coating fluid F is in a state of being bridged and held between the pair of fluid holding surfaces 35L and 35R of the fluid holding surface forming members 34L and 34R, respectively. Furthermore, a coating fluid pool 37 is formed in the vicinity of distal ends 36L and 36R of the fluid holding surfaces 35L and 35R which are nozzle tips. When the striking force of the air G (see FIG. 3A) is applied to the coating fluid pool 37, the coating fluid is separated with the distal ends 36L and 36R being fluid separation positions, and coating fluid droplets 42 having a size corresponding to the size of the coating fluid pool 37 are formed. The countless coating fluid droplets 42 generated by instantaneous repetitions of generation and separation of the coating fluid pool 37 fly towards the substrate 40 together with the air G, thereby forming the coating film 41. Note that, in the case of the spray nozzle not including the fluid holding surfaces 35L and 35R, since the fluid separation position of the coating fluid pool is the distal end of the coating fluid discharge port 31, the coating fluid pool 37 is in contact with four inner surfaces forming the rectangular coating fluid discharge port in the width direction and the thickness direction. On the other hand, in the spray nozzle 10 of the present invention, the coating fluid pool 37 is only in contact with the two fluid holding surfaces 35L and 35R with a small contact area, which makes it easier to separate the coating fluid pool, and thus the droplets can be micronized even with a small air striking force. Note that, in a case where the discharge direction length H1 of the fluid holding surfaces 35L and 35R is small and the distal end of the coating fluid discharge port 31 and the fluid holding surfaces 35L and 35R are close to each other, the fluid pool 37 is substantially in contact with the four inner surfaces forming the rectangular coating fluid discharge port 31 in the width direction and the thickness direction, and the effect of the present invention cannot be achieved. Therefore, H1 needs to be more than or equal to 30 μm. In addition, in order to stably bridge and hold the discharged coating fluid, H1 is preferably less than or equal to 400 μm.

The supply conditions of the air G discharged from the air discharge ports 33*a* and 33*b* cannot be generally defined depending on a desired type of coating fluid, a desired coating film thickness, and others; however, from the viewpoint of minimizing the air flow rate to be used while maintaining the striking force for micronizing droplets and the viewpoint of minimizing disturbance of the discharged air flow, the pressure measured in the air manifolds 17*a* and 17*b* is preferably approximately in a range of 50 kPa to 200 kPa, and the air flow rate is preferably within a range of 900 NL/min to 1500 NL/min per air discharge width of 1 m.

Figure 4A:
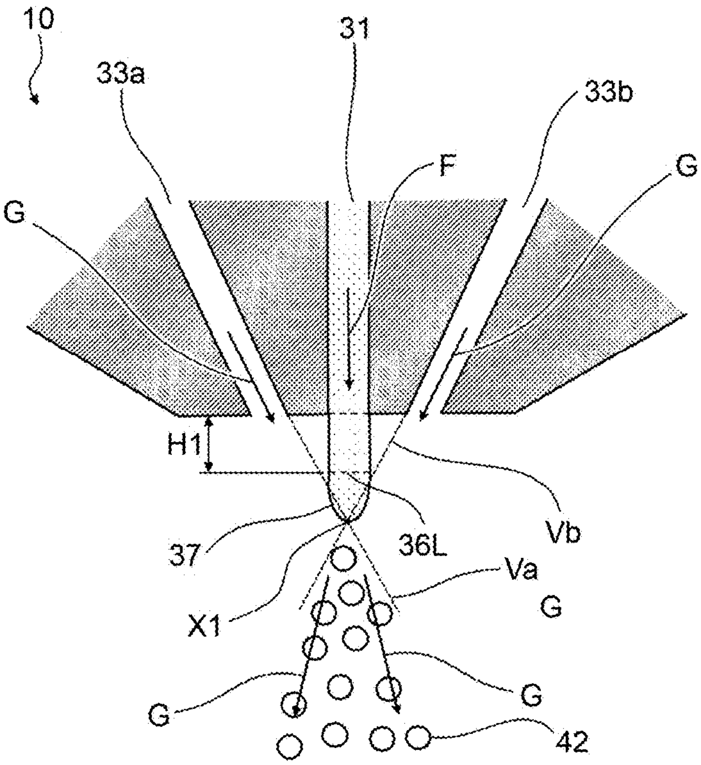
FIG. 4A is a cross-sectional view for explaining generation of coating fluid droplets at the time of spray nozzle application of the present invention with the distal end of the spray nozzle viewed from the width direction.
Figure 4B:
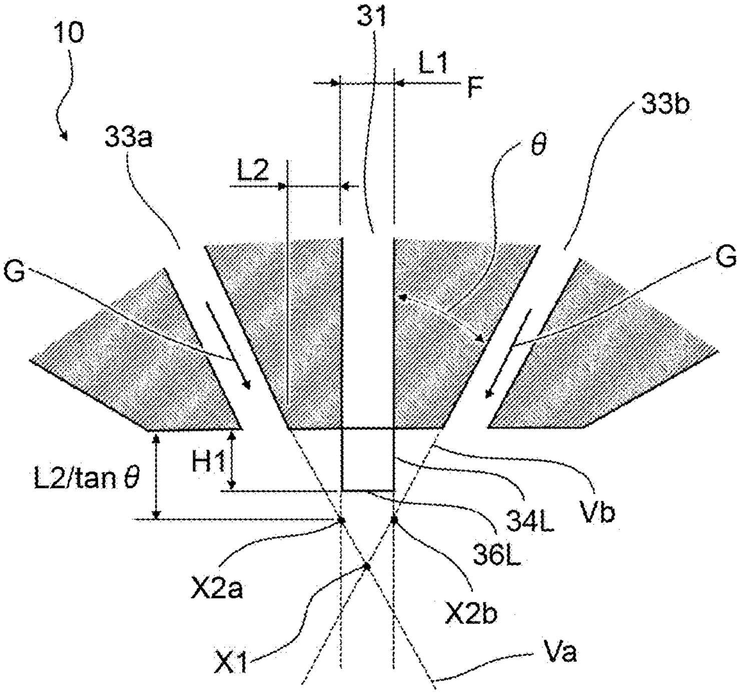
FIG. 4B is a diagram for explaining generation of coating fluid droplets at the time of spray nozzle application of the present invention, in which the coating fluid is removed from the state illustrated in FIG. 4A.
Figure 5:
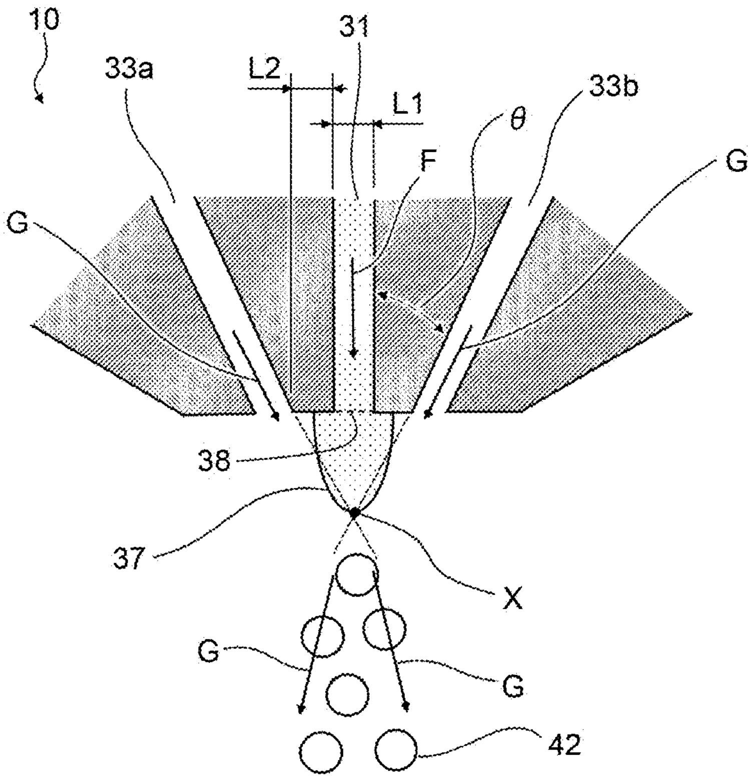
FIG. 5 is a diagram for explaining generation of coating fluid droplets at the time of spray nozzle application and is a cross-sectional view of a distal end of a spray nozzle of the prior art not including fluid holding surfaces as viewed from a width direction.

FIGS. 4A, 4B, and 5 are diagrams for explaining generation of coating fluid droplets at the time of spray nozzle application. FIG. 4A is a width-direction cross-sectional view of the distal end of the spray nozzle of the present invention. FIG. 4B is a diagram in which the coating fluid is removed from the state illustrated in FIG. 4A. FIG. 5 is a width-direction cross-sectional view of a distal end of a spray nozzle of the prior art having no fluid holding surfaces.

As illustrated in FIG. 4A, the coating fluid droplets 42 are generated at a position (hereinafter, simply referred to as a "striking force position") X1 where the striking force of the discharged air G is obtained. The striking force position X1 is an intersection of a pair of virtual extension lines Va and Vb extending in the air discharge direction from the ridge portions of the air discharge ports 33*a* and 33*b* on the side of the coating fluid discharge ports 31. In addition, since the coating fluid pool 37 is generated in a space between nozzle tips 36L (36R) as the fluid separation position and the striking force position, the coating fluid pool 37 can be made smaller by bringing the nozzle tips 36L (36R) close to the striking force position X1 and making the space smaller, whereby the generated coating fluid droplets 42 can also be made smaller. However, as illustrated in FIG. 4B, in a case where the fluid holding surface forming members 34L (34R) are brought close to the striking force position X1 to obliquely intersect with the virtual extension lines Va and Vb and points X2*a* and X2*b*, the discharged air G collides with the fluid holding surface forming member 34L (34 R) and is disturbed, whereby the application accuracy may be deteriorated. Incidentally, the distances from the coating fluid discharge port to the points X2*a* and X2*b* can be expressed by L2/tan θ, where θ (for example, let an angle formed by the virtual extension line Vb and the fluid holding surface of the fluid holding surface forming member 34L be θ) denotes an angle (acute angle) formed by the discharge direction of the air discharged from an air discharge port and the discharge direction of the coating fluid, and L2 (μm) denotes an interval between the coating fluid discharge port and the air discharge port. Hereinafter, the angle θ may be referred to as an "air discharge angle θ". In order not to cause the above problem, the discharge direction length H1 (μm) of the fluid holding surface needs to fall within a range of the following Inequation (1).

$$(L2/\tan\theta) - 100 \le H1 \le L2/\tan\theta \quad (1)$$

In the case of the conventional spray nozzle not including the fluid holding surfaces illustrated in FIG. 5, since the coating fluid pool 37 is generated between a distal end 38 of the coating fluid discharge port and the striking force position, the fluid pool 37 becomes larger than that of the spray nozzle of the present invention, and generated coating fluid droplets 42 also become larger.

Figure 6A:
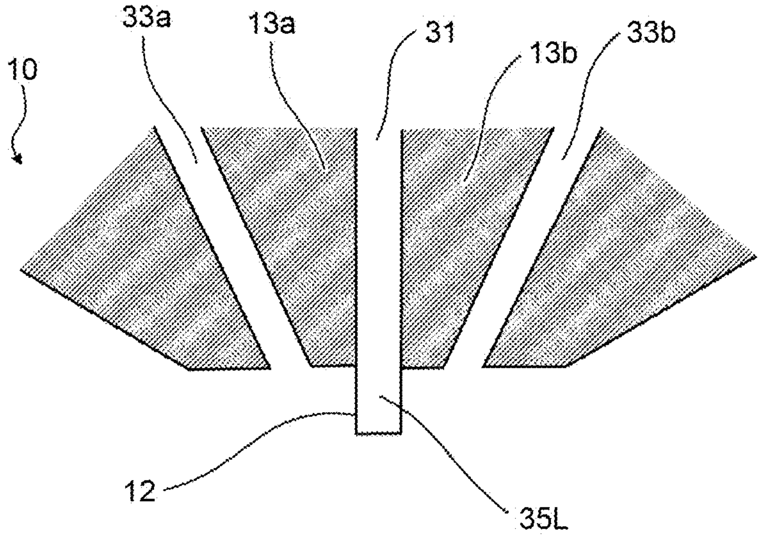
FIG. 6A is a diagram for explaining a preferred embodiment of the spray nozzle of the present invention and is a cross-sectional view as viewed from the width direction.
Figure 6B:
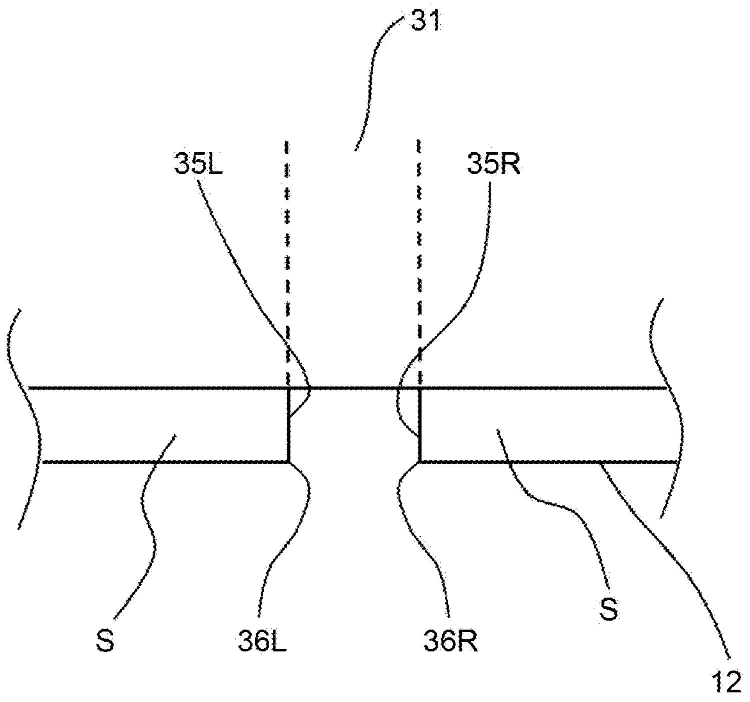
FIG. 6B is a diagram for explaining the preferred embodiment of the spray nozzle of the present invention and is a diagram of a distal end of one coating fluid discharge port as viewed from the conveyance direction of the substrate.

An example of a preferred embodiment of the spray nozzle will be described with reference to FIGS. 6A and 6B. FIGS. 6A and 6B are diagrams for explaining the preferred embodiment of the spray nozzle of the present invention. FIG. 6A is a width-direction cross-sectional view. FIG. 6B is a diagram of a distal end of one coating fluid discharge port as viewed from the conveyance direction of the substrate.

As in a spray nozzle 10 illustrated in FIG. 6A, it is preferable that the fluid holding surface 35L (35R) is formed by forming the coating fluid discharge ports 31 from a comb-shaped shim 12 and the pair of nozzle blocks 13*a* and 13*b* that clamp the comb-shaped shim 12 and making the comb-shaped shim 12 protrude in the discharge direction of the coating fluid from the distal ends of the nozzle blocks 13*a* and 13*b*. With a part of the comb-shaped shim 12 serving as the fluid holding surface 35L (35R), the coating fluid discharge port 31 to the fluid holding surface 35L (35R) is flush with no connection portion, and thus the discharge of the coating fluid can be stabilized. In addition, since each of fluid holding surfaces 35L (35R) corresponding to one of the plurality of coating fluid discharge ports 31 is formed of a single component, the variation in shape can be suppressed, whereby a high application accuracy can be maintained.

It is preferable that a surface S (the same applies to the back surface) of a portion of the comb-shaped shim 12 protruding from a nozzle block illustrated in FIG. 6B has fluid repellency against water, the surface S observable from the thickness direction of the comb-shaped shim 12. By imparting fluid repellency to the surface S, wet-spreading of the coating fluid bridged across the fluid holding surfaces 35L and 35R to the surface S can be reduced, whereby a stable coating fluid pool can be generated. Incidentally, the term "having fluid repellency against water" means that a contact angle of the surface S to pure water is more than or equal to 90°, and more preferably more than or equal to 120°. In the present invention, it is preferable that the comb-shaped shim is made of a metal material, particularly stainless steel, from the viewpoint of working accuracy, durability, corrosion resistance, and the like. Therefore, as a method for imparting fluid repellency, coating such as a fluororesin or a water-repellent plating film can be used. From the viewpoint of fluid repellency durability, a method of modifying the metal surface by micro-nano patterning or the like to impart fluid repellency is more preferable.

The fluid holding surfaces 35L and 35R are desirably substantially orthogonal to the width direction. If the fluid holding surfaces 35L and 35R do not spread towards the end in the fluid discharge direction, the interval between the nozzle tips 36L and 36R does not expand, and thus the coating fluid can be stably bridged and held. In addition, if the fluid holding surfaces 35L and 35R are not narrowed towards the end in the fluid discharge direction, the coating fluid does not spread onto the surface S, and generation of the coating fluid droplets is stabilized. Since the fluid holding surfaces 35L and 35R are substantially orthogonal to the width direction, the coating fluid discharged from the coating fluid discharge ports 31 can be stably bridged and held. It is also possible to reduce the variation in the ejection direction of the coating fluid droplets when a coating fluid pool is separated by the striking force of the discharged air. Incidentally, the term "substantially orthogonal" means that an error in manufacturing is allowed and that an angle formed by a normal line of the fluid holding surface 35L or 35R and the width direction is less than or equal to 5 degrees.

It is preferable that the radiuses of curvature of the ridge lines of the distal ends 36L and 36R of the fluid holding surfaces 35L and 35R, respectively, are less than or equal to 30 μm. Since the smaller the radiuses of curvature are, the more stable the separation of the coating fluid pool at the ridge portions is, the variation in the ejection direction of the coating fluid droplets can be reduced when the coating fluid pool is separated by the discharged air.

Figure 7:
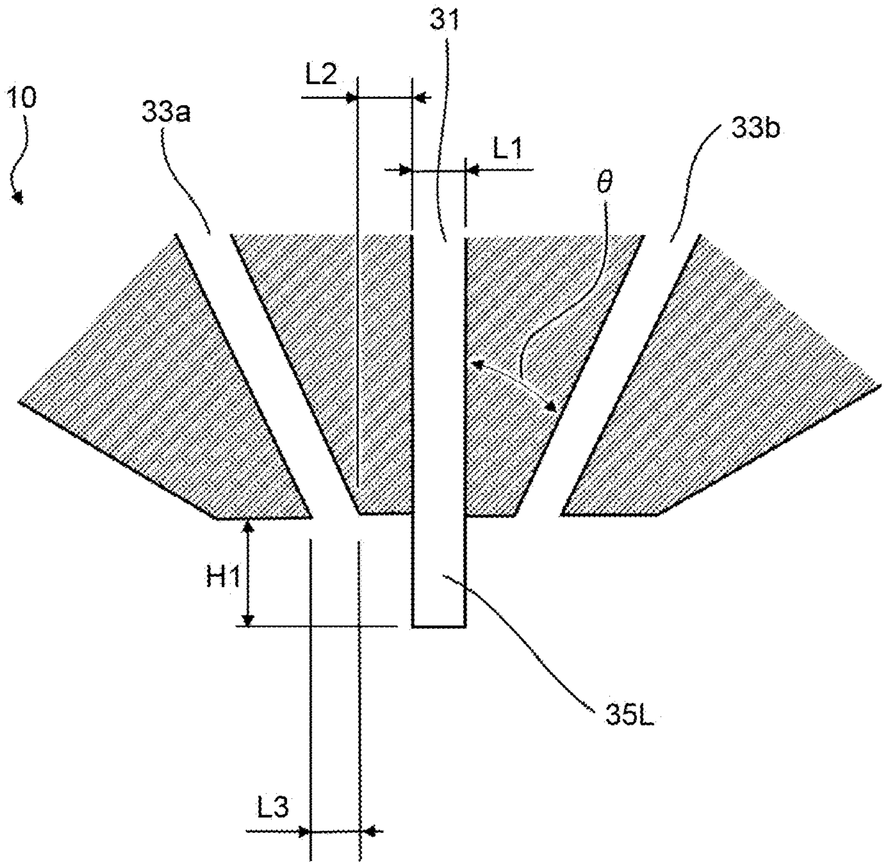
FIG. 7 is a cross-sectional view for explaining characteristic dimensions of the spray nozzle illustrated in FIGS. 6A and 6B as viewed from the width direction.

FIG. 7 is a width-direction cross-sectional view for explaining characteristic dimensions of the spray nozzle illustrated in FIGS. 6A and 6B. In FIG. 7, an angle (for example, angle θ) formed by the coating fluid discharge port 31 and the air discharge port 33*a* or 33*b* is preferably within a range of 15 degrees to 45 degrees. In a case where the angle θ is more than or equal to 15 degrees, the air discharged from the air discharge ports 33*a* and 33*b* can apply a sufficient striking force to the coating fluid to form the coating fluid droplets. In a case where θ is less than or equal to 45 degrees, the number of coating fluid droplets flying in the substrate advancing direction is small, and thus the number of coating fluid droplets scattering without adhering to the substrate is also small, whereby a decrease in the use efficiency of the coating fluid can be suppressed.

An optimum value of a gap L1 of the coating fluid discharge ports 31 varies depending on the viscosity of the coating fluid in use and the flow rate of the coating fluid to be discharged; however, the gap L1 is preferably more than or equal to 50 μm from the viewpoint of reducing the variation in the shape of the discharge ports and is preferably less than or equal to 200 μm in order to make the coating fluid to be distributed from the coating fluid manifold to each of the coating fluid discharge ports uniform in the amount.

An interval L2 between the coating fluid discharge port 31 and the air discharge port 33*a* or 33*b* is preferably less than or equal to 100 μm. In a case where the interval L2 is less than or equal to 100 μm, the distance from the distal ends of the air discharge ports 33*a* and 33*b* to the striking force position is short, and thus the striking force of the air applied to the coating fluid can be sufficiently increased. In addition, since the length H1 of the fluid holding surface 35L (35R) can be made short, the coating fluid can be stably bridged and held.

A gap (for example, a gap L3) of each of the air discharge ports 33*a* and 33*b* is preferably less than or equal to 100 μm. In a case where the interval L3 is less than or equal to 100 μm, the average flow rate of the discharged air is sufficiently high, and the striking force of the air applied to the coating fluid is also sufficiently large, and thus the coating fluid droplets can be micronized. Furthermore, the amount of air for micronizing the coating fluid droplets can also be reduced.

Figure 8:
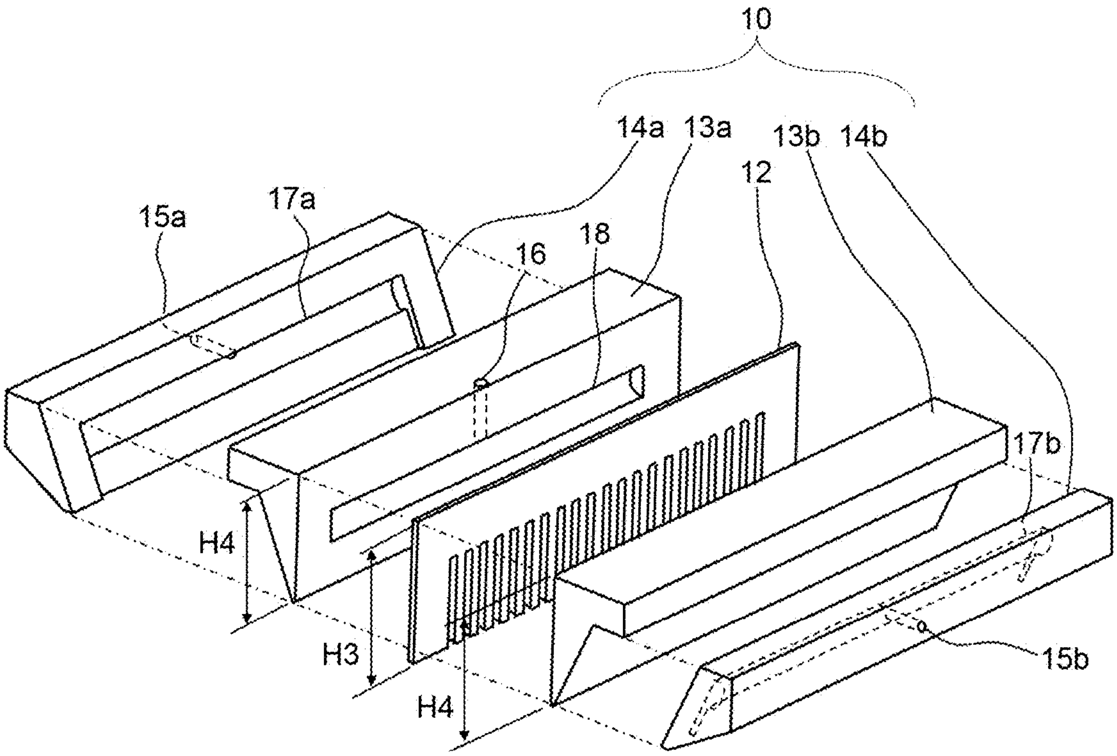
FIG. 8 is an exploded perspective view for explaining the structure of the spray nozzle illustrated in FIGS. 6A and 6B.

FIG. 8 is an exploded perspective view for explaining the structure of the spray nozzle illustrated in FIGS. 6A and 6B. In FIG. 8, the spray nozzle 10 includes components denoted by reference numerals 12, 13*a*, 13*b*, 14*a*, and 14*b*. Reference numerals 13*a* and 13*b* denote inner blocks for forming the coating fluid manifold 18 and the coating fluid discharge ports 31. One inner block 13*a* has the coating fluid supply port 16 for receiving the coating fluid and the coating fluid manifold 18 for spreading the coating fluid in the width direction. The coating fluid supply port 16 communicates from an outer surface of the inner block 13*a* to the coating fluid manifold 18. Next, reference numeral 12 denotes the comb-shaped shim sandwiched between the inner blocks 13*a* and 13*b*, and when the inner blocks 13*a* and 13*b* and the shim 12 are combined, the plurality of coating fluid discharge ports 31 is formed in the width direction by the gaps between comb teeth of the shim 12. Further, a height H3 of the shim 12 is higher than heights H4 of the inner blocks 13*a* and 13*b*, and by making the height H3 higher than the height H4 by the length H1, the comb-shaped shim 12 protrudes by the length H1 in the discharging direction of the coating fluid from the distal end ends of the nozzle blocks 13*a* and 13*b*, whereby the fluid holding surfaces are formed. Reference numerals 14*a* and 14*b* denote the outer blocks, which are combined with the inner blocks 13*a* and 13*b*, respectively, to form the air discharge ports for discharging air. The shape of the air discharge ports in this case is one continuous slit in the width direction. The outer blocks 14*a* and 14*b* has, respectively, the air supply ports 15*a* and 15*b* that receive air and the air manifolds 17*a* and 17*b* that spread the air in the width direction on the mating surface side with the outer blocks 14*a* and 14*b*, respectively. The air supply ports 15*a* and 15*b* communicate from outer surfaces of the outer blocks 14*a* and 14*b* to the air manifolds 17*a* and 17*b*, respectively.

Figure 9:
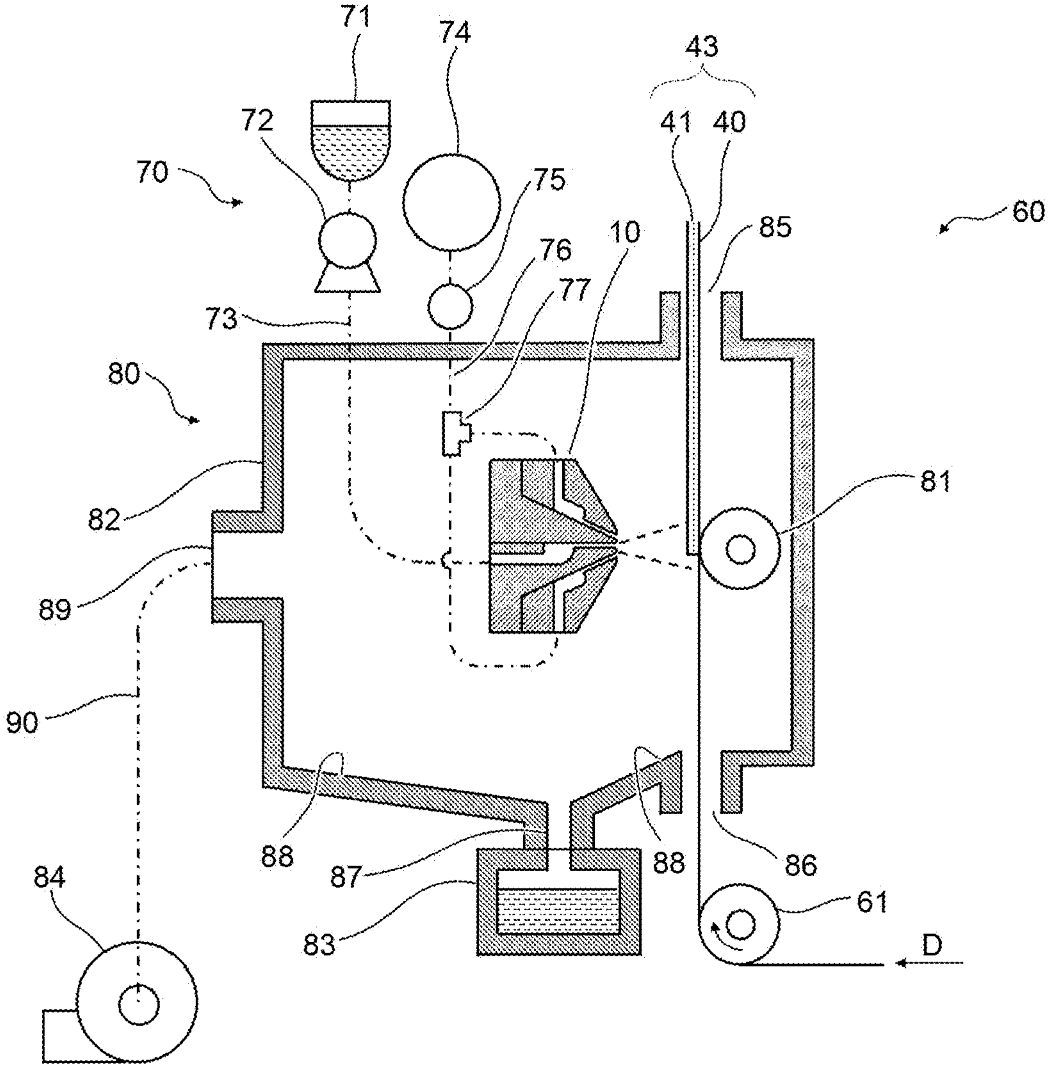
FIG. 9 is a side view illustrating a schematic structure of a coating device using the spray nozzle of the present invention.

FIG. 9 is a side view illustrating a schematic structure of a coating device using the spray nozzle of the present invention. A spray coating device 60 of FIG. 9 includes a coating unit 80 having a spray nozzle 10, a supply unit 70 that supplies coating fluid and air to the spray nozzle 10, and a feed roll 61 that is a moving unit that relatively moves the substrate 40 with respect to the spray nozzle 10.

The coating unit 80 includes the spray nozzle 10, a backup roll 81 which is a support unit of the substrate, a booth 82 covering around the spray nozzle 10 and the backup roll 81, a waste fluid collecting tank 83, and a decompression unit 84. The backup roll 81 supports the substrate being conveyed at an application location by the spray nozzle. In addition, the booth 82 has a substantially closed system closing the inside of the booth 82 except for an inlet opening 85, an outlet opening 86, and the like through which the substrate 40 passes and prevents scattering of the coating fluid droplets discharged from the spray nozzle 10 to the outside of the coating unit 80. A lower opening 87 of the booth communicates with the waste fluid collecting tank 83, and excessive coating fluid generated in the booth falls along slopes 88 in the booth and is collected in the waste fluid collecting tank 83 via the lower opening 87. In addition, a rear opening 89 of the booth is connected to the decompression unit 84 via an intake pipe 90. When the inside of the booth is brought into a reduced pressure environment by driving of the decompression unit 84, the outside air flows to the inside of the booth at the inlet opening 85 and the outlet opening 86, and thus scattering of the coating fluid discharged from the spray nozzle 10 to the outside of the booth can be prevented.

The supply unit 70 supplies the coating fluid to the spray nozzle 10 via a coating fluid pipe 73 by a coating fluid tank 71 and a metering pump 72. Moreover, air whose pressure has been adjusted by a compressed air source 74 and a pressure regulating valve 75 is supplied to the spray nozzle 10 via an air pipe 76 and a branch pipe 77.

The feed roll 61 as a moving unit is coupled to a driving unit (not illustrated). The substrate 40 is conveyed in the conveyance direction D at a desired conveyance speed by rotating the feed roll 61 by the drive unit.

With the spray coating device 60, a uniform coating film 41 can be formed on the substrate 40 being conveyed, and a film-coated member 43 can be manufactured. Note that a drying unit that dries the coating film 41 on the film-coated member 43 conveyed from the coating device 60 may be further included. A method of drying the coating film in the drying unit is not particularly limited, and a method of blowing a heat medium such as hot air, a heat oven method using a heater, or the like can be used.

The spray nozzle 10 of the present invention used in the spray coating device 60 can generate fine coating fluid droplets even at a low air flow rate that does not disturb the straightness of flying coating fluid droplets, and thus the film-coated member 43 coated with a thin film which is wide and has high uniformity in the width direction can be obtained.

Although the spray coating device 60 of FIG. 9 exemplifies an aspect in which the coating unit 80 is not moved and the substrate 40 is conveyed (moved) by the moving unit, the coating device of the present invention may employ an aspect in which the substrate 40 is not moved, whereas the coating unit 80 is moved by the moving unit.

EXAMPLES

Examples will be described below; however, embodiments of the present invention are not limited to these examples.

Using the spray coating device illustrated in FIG. 9, spray conditions were prepared in which the discharge direction length H1 (μm) of the fluid holding surfaces, the shape of the fluid holding surfaces, the interval L2 (μm) between a coating fluid discharge port and an air discharge port, and the air flow rate (NL/min) per width of 1 m are changed as shown in Table 1 to obtain comparative examples and examples. Note that the shape of the fluid holding surfaces being "orthogonal" means that the fluid holding surfaces are orthogonal to the width direction, and in the case of "narrowing-end" or "spreading-end", the angle (dihedral angle) formed by the pair of fluid holding surfaces facing each other is set to 30°.

In the spray nozzle, the coating fluid discharge width W1 was set to 1000 mm, the gap L1 of the coating fluid discharge ports was set to 100 μm, and the air discharge angle θ was set to 25°, and the air discharge ports were each set to have one slit shape in the width direction.

As for the coating fluid, a dispersion liquid in which a resist pigment was dispersed in propylene glycol monomethyl ether acetate (PMA) was used such that a solid content concentration was 14 mass % and a viscosity was 4.0 cp, and a spray flow rate of the coating fluid was set to 100 ml/min.

[Evaluation of Average Droplet Diameter]

Whether or not a thin coating film can be formed by the spraying cannot be uniformly determined depending on desired spraying conditions such as the substrate conveyance speed or the flow rate of the coating fluid, and thus the comparison and evaluation were performed on the basis of the fineness of an average diameter of generated droplets.

Under each condition in Table 1, the diameter of the coating fluid droplet sprayed from the spray nozzle was measured using a laser diffraction type particle size distribution meter FLD-319A manufactured by Seika Digital Image CORPORATION. The measurement was performed by irradiating a coating fluid droplet group at a position 120 mm away from the spray nozzle distal end in the discharge direction with a laser beam in a direction orthogonal to the width direction of the spray nozzle and the discharge direction. The measured average droplet diameter was evaluated according to the following evaluation ranks. Incidentally, the Sauter mean diameter was used as the average droplet diameter.

[Evaluation Rank of Average Droplet Diameter]

○: The average particle size of the coating fluid droplets is less than 30 μm.

x: The average particle size of the coating fluid droplets is greater than or equal to 30 μm.

[Evaluation of Coating Film Uniformity]

Next, in order to evaluate the uniformity of a coating film, coating fluid was sprayed onto a PET film under each condition in Table 1 to form a coating film. The coating film thickness of the prepared coating film was measured at intervals of 10 mm in the width direction, and then the variation from the film thickness average value was calculated, whereby the coating film uniformity was evaluated depending on the following evaluation ranks. Note that the distance from the spray nozzle distal end to the substrate was set to 120 mm. The substrate was a PET film having a substrate width of 1000 mm and a thickness of 100 μm and was conveyed at a speed of 1 m/min.

[Evaluation Rank of Coating Film Uniformity]

◎: Film thickness variation exceeding ±10% did not occur.

○: Film thickness variation exceeding ±10% occurred. Film thickness variation exceeding 15% did not occur.

X: Film thickness variation exceeding ±15% occurred.

Example 1

Evaluation was performed with H1 of 40 μm, L2 of 50 μm, the shape of the fluid holding surface of being orthogonal, and an air discharge flow rate of 1200 NL/min per 1 m width. Both the average droplet diameter and the uniformity of the coating film thickness showed good results. Setting conditions and evaluation results in Example 1 are shown in Table 1.

TABLE 1

| Conditions | Discharge-Direction Length H1 [μm] of Fluid Holding Surfaces | Air Discharge Angle θ [Degrees] | Interval L2 [μm] between Coating Fluid Discharge Port and Air Discharge Port | L2/tan θ | Inequation (1) | Shape of Fluid Holding Surface | Air Discharge Flow Rate [NL/min] | Droplet Diameter [μm] | Average Droplet Diameter | Coating Film Uniformity |
|---|---|---|---|---|---|---|---|---|---|---|
| Example 1 | 40 | 25 | 50 | 107.2 | Satisfied | Orthogonal | 1200 | 25 | ○ | ◎ |
| Example 2 | 100 | 25 | 50 | 107.2 | Satisfied | Orthogonal | 1200 | 21 | ○ | ◎ |
| Example 3 | 100 | 25 | 50 | 107.2 | Satisfied | Orthogonal | 1600 | 20 | ○ | ○ |
| Example 4 | 100 | 25 | 50 | 107.2 | Satisfied | Narrowing-end | 1200 | 24 | ○ | ○ |

TABLE 1-continued

| Conditions | Discharge-Direction Length H1 [μm] of Fluid Holding Surfaces | Air Discharge Angle θ [Degrees] | Interval L2 [μm] between Coating Fluid Discharge Port and Air Discharge Port | L2/tan θ | Inequation (1) | Shape of Fluid Holding Surface | Air Discharge Flow Rate [NL/min] | Droplet Diameter [μm] | Average Droplet Diameter | Coating Film Uniformity |
|---|---|---|---|---|---|---|---|---|---|---|
| Example 5 | 100 | 25 | 50 | 107.2 | Satisfied | Spreading-end | 1200 | 22 | ○ | ○ |
| Example 6 | 200 | 25 | 100 | 214.5 | Satisfied | Orthogonal | 1200 | 29 | ○ | ◎ |
| Comparative Example 1 | 0 | 25 | 50 | 107.2 | Not Satisfied | Orthogonal | 1200 | 32 | X | X |
| Comparative Example 2 | 20 | 25 | 50 | 107.2 | Satisfied | Orthogonal | 1200 | 31 | X | X |
| Comparative Example 3 | 150 | 25 | 50 | 107.2 | Not Satisfied | Orthogonal | 1200 | 23 | ○ | X |
| Comparative Example 4 | 100 | 25 | 100 | 214.5 | Not Satisfied | Orthogonal | 1200 | 40 | X | X |
| Comparative Example 5 | 300 | 25 | 100 | 214.5 | Not Satisfied | Orthogonal | 1200 | 27 | ○ | X |

Example 2

Conditions were the same as those in Example 1 except that H1 was modified to 100 μm. Both the average droplet diameter and the uniformity of the coating film thickness showed good results. Setting conditions and evaluation results in Example 2 are shown in Table 1.

Example 3

Conditions were the same as those in Example 2 except that the air discharge flow rate was increased to 1600 NL/min per 1 m width. Although the discharged air was disturbed as compared with Example 2, both the average droplet diameter and the uniformity of the coating film thickness were good. Setting conditions and evaluation results in Example 3 are shown in Table 1.

Example 4

Conditions were the same as those in Example 2 except that the shape of the fluid holding surface was changed to a narrowing-end shape. Although the coating fluid discharged from some of the plurality of coating fluid discharge ports arranged in the width direction spread onto the fluid holding surface forming members, both the average droplet diameter and the uniformity of the coating film thickness showed good results. Setting conditions and evaluation results in Example 4 are shown in Table 1.

Example 5

Conditions were the same as those in Example 2 except that the shape of the fluid holding surface was changed to a spreading-end shape. Although the coating fluid discharged from some of the plurality of coating fluid discharge ports arranged in the width direction could not be retained up to the nozzle tip and was transformed into coating fluid droplets, both the average droplet diameter and the uniformity of the coating film thickness showed good results. Setting conditions and evaluation results in Example 5 are shown in Table 1.

Example 6

Evaluation was performed with H1 of 200 μm, L2 of 100 μm, the shape of the fluid holding surface of being orthogonal, and an air discharge flow rate of 1200 NL/min per 1 m width. Both the average droplet diameter and the uniformity of the coating film thickness showed good results. Setting conditions and evaluation results in Example 6 are shown in Table 1.

Conditions were the same as those in Example 1 except that H1 was modified to 0 μm. The average diameter of the coating fluid droplets was large, and granular unevenness was generated in the coating film due to the large average diameter, and thus the coating film uniformity was low. Setting conditions and evaluation results in Comparative Example 1 are shown in Table 1.

Comparative Example 2

Conditions were same as those in Example 1 except that H1 was modified to 20 μm. As in Comparative Example 1, the average diameter of the coating fluid droplets was large, and granular unevenness was generated in the coating film due to the large average diameter, and thus the coating film uniformity was low. Setting conditions and evaluation results in Comparative Example 2 are shown in Table 1.

Comparative Example 3

Conditions were the same as those in Example 1 except that H1 was modified to 150 μm. Since the discharged air collided with the fluid holding surface forming member, the flow of the discharged air was disturbed, and thus the coating film uniformity was low. Setting conditions and evaluation results in Comparative Example 3 are shown in Table 1.

Comparative Example 4

Conditions were the same as those in Example 6 except that H1 was modified to 100 μm. The average diameter of the coating fluid droplets was large, and granular unevenness was generated in the coating film due to the large average diameter, and thus the coating film uniformity was low.

Setting conditions and evaluation results in Comparative Example 4 are shown in Table 1.

Comparative Example 5

Conditions were the same as those in Example 6 except that H1 was modified to 300 μm. Since the discharged air collided with the fluid holding surface forming member, the flow of the discharged air was disturbed, and thus the coating film uniformity was low. Setting conditions and evaluation results in Comparative Example 5 are shown in Table 1.

From the above Examples, it was confirmed that the coating fluid droplets were micronized and that the coating film uniformity was improved, and the effectiveness of the present invention was confirmed.

INDUSTRIAL APPLICABILITY

The present invention is effective as a slot-type spray nozzle, a coating device, and a manufacturing method of a film-coated member capable of forming fine coating fluid droplets even in a case where a discharged air flow rate is reduced and uniformly forming a thin coating film on a wide substrate.

REFERENCE SIGNS LIST

10 SPRAY NOZZLE
12 COMB-SHAPED SHIM
13*a*, 13*b* INNER NOZZLE BLOCK
14*a*, 14*b* OUTER NOZZLE BLOCK
15*a*, 15*b* AIR SUPPLY PORT
16 COATING FLUID SUPPLY PORT
17*a*, 17*b* AIR MANIFOLD
18 COATING FLUID MANIFOLD
31 COATING FLUID DISCHARGE PORT
33*a*, 33*b* AIR DISCHARGE PORT
34 FLUID HOLDING SURFACE FORMING MEMBER
35L, 35R FLUID HOLDING SURFACE
36L, 36R NOZZLE TIP
37 COATING FLUID POOL
38 COATING FLUID DISCHARGE PORT DISTAL END
40 SUBSTRATE
41 COATING FILM
42 COATING FLUID DROPLET
43 FILM-COATED SUBSTRATE
60 SPRAY COATING DEVICE
61 FEED ROLL
70 SUPPLY UNIT
71 COATING FLUID TANK
72 METERING PUMP
73 COATING FLUID PIPE
74 COMPRESSED AIR SOURCE
75 PRESSURE REGULATING VALVE
76 AIR PIPE
77 BRANCH PIPE
80 COATING UNIT
81 BACKUP ROLL
82 BOOTH
83 WASTE FLUID COLLECTING TANK
84 DECOMPRESSION UNIT
85 INLET OPENING
86 OUTLET OPENING
87 LOWER OPENING
88 BOOTH INCLINED SURFACE
89 REAR OPENING
90 INTAKE PIPE
D CONVEYANCE DIRECTION
F COATING FLUID
G DISCHARGED AIR
H1 DISCHARGE DIRECTION LENGTH OF FLUID HOLDING SURFACE
H3 HEIGHT OF COMB-SHAPED SHIM
H4 HEIGHT OF INNER BLOCK
L1 GAP OF COATING FLUID DISCHARGE PORT
L2 INTERVAL BETWEEN COATING FLUID DISCHARGE PORT AND AIR DISCHARGE PORT
L3 AIR DISCHARGE PORT THICKNESS
P COATING FLUID DISCHARGE PORT ARRANGEMENT PITCH
S SURFACE OBSERVABLE FROM THICKNESS DIRECTION OF COMB-SHAPED SHIM
Va, Vb VIRTUAL EXTENSION LINE OF DISCHARGED AIR
W1 COATING FLUID DISCHARGE WIDTH
W2 COATING FLUID DISCHARGE PORT WIDTH
W3 AIR DISCHARGE WIDTH
X1 STRIKING FORCE POSITION
X2*a*, X2*b* POINT WHERE DISCHARGED AIR COLLIDES WITH FLUID HOLDING SURFACE FORMING MEMBER
θ AIR DISCHARGE ANGLE

The invention claimed is:

1. A slot-type spray nozzle comprising:

a plurality of coating fluid discharge ports arranged in one direction; and a pair of air discharge ports continuously or intermittently opened in a vicinity of the coating fluid discharge ports in a width direction, the width direction being the one direction, the air discharge ports being arranged to sandwich the coating fluid discharge ports, the air discharge ports being formed such that air discharged from the air discharge ports obliquely intersects with a discharge direction of coating fluid, wherein the slot-type spray nozzle further includes a pair of fluid holding surfaces extending in the discharging direction of the coating fluid from sides forming both ends in the width direction of the coating fluid discharge ports, the fluid holding surfaces facing each other across the coating fluid discharge ports, and with a length of the fluid holding surfaces in the discharge direction of the coating fluid denoted by H1 (μm), an angle (acute angle) formed by a discharge direction of the air discharged from an air discharge port and the discharge direction of the coating fluid denoted by θ (degrees), and an interval between the coating fluid discharge ports and the air discharge port denoted by L2 (μm), H1≥30 μm and following Inequation (1) are satisfied:

$$L2/\tan\theta - 100 \le H1 \le L2/\tan\theta. \quad (1)$$

2. The slot-type spray nozzle according to claim 1, wherein the coating fluid discharge ports are formed of a comb-shaped shim and a pair of nozzle blocks clamping the comb-shaped shim, the comb-shaped shim protrudes from distal ends of the nozzle blocks in the discharging direction of the coating fluid, and the fluid holding surfaces are a part of a portion of the comb-shaped shim, the portion protruding from the nozzle blocks.

3. The slot-type spray nozzle according to claim 2, wherein a surface of the portion of the comb-shaped shim protruding from the nozzle blocks has fluid repellency against water, the surface observable from a thickness direction of the comb-shaped shim.

4. The slot-type spray nozzle according to claim 1, wherein the fluid holding surfaces are substantially orthogonal to the width direction.

5. The slot-type spray nozzle according to claim 1, wherein a radius of curvature of a ridge line of a distal end of each of the fluid holding surfaces is less than or equal to 30 μm.

6. The slot-type spray nozzle according to claim 1, wherein the L2 is less than or equal to 100 μm.

7. A coating device comprising:

the slot-type spray nozzle according to claim 1;

a supply unit configured to supply the coating fluid and the air to the slot-type spray nozzle;

a support unit configured to support a to-be-coated member; and a moving unit configured to relatively move the to-be-coated member supported by the support unit with respect to the slot-type spray nozzle.

8. A manufacturing method of a film-coated member, the method comprising: using the coating device according to claim 7; discharging the coating fluid from the coating fluid discharge ports while discharging the air from the air discharge ports; and spraying the coating fluid onto the to-be-coated member supported by the support unit to manufacture a member on which a coating film is formed.

9. The manufacturing method of a film-coated member according to claim 8, wherein an air flow rate discharged from the air discharge ports is within a range of 900 NL/min to 1500 NL/min per width of 1 m.

* * * * *